United States Patent [19]

Tortorello et al.

[11] Patent Number: 4,533,682

[45] Date of Patent: Aug. 6, 1985

[54] IMIDAZOLIDINE-BLOCKED AMINE POLYMERS

[75] Inventors: Anthony J. Tortorello, Elmhurst; Nestor P. Hansen, Mt. Prospect; Kathryn M. Jarocki, Chicago, all of Ill.

[73] Assignee: DeSoto, Inc., Des Plaines, Ill.

[21] Appl. No.: 489,782

[22] Filed: Apr. 29, 1983

[51] Int. Cl.$^3$ ............................................. C08L 63/00
[52] U.S. Cl. ............................ 523/414; 523/415; 523/416; 523/420; 524/901; 525/481; 525/510; 528/45; 528/103; 528/107; 528/113; 528/117; 528/228; 528/418; 528/407; 204/181.7
[58] Field of Search ............... 204/181 C; 524/901; 525/481, 510; 528/45, 103, 107, 113, 117, 228, 418, 407; 523/414, 415, 416, 420

[56] References Cited

U.S. PATENT DOCUMENTS

| | | | |
|---|---|---|---|
| 2,352,387 | 6/1944 | Hopff et al. | 528/228 |
| 3,468,830 | 9/1969 | Kiss et al. | 528/107 |
| 4,110,287 | 8/1978 | Bosso et al. | 528/117 |
| 4,358,571 | 11/1982 | Kaufman et al. | 528/117 |

OTHER PUBLICATIONS

Colette et al., Chemical Abstracts, (81) 77361y, 1974.

*Primary Examiner*—John Kight
*Assistant Examiner*—Kriellion Morgan
*Attorney, Agent, or Firm*—Dressler, Goldsmith, Shore, Sutker & Milnamow, Ltd.

[57] ABSTRACT

Adducts of imidazolidine compounds, such as the reaction product of ethylene diamine with cyclohexanone, are provided with organic polyepoxides, especially with low molecular weight polyepoxides where the imidazolidine acts as a chain extender, and the adduct is reacted with an acid to protonate at least 50% of the amine groups in the adduct. These protonated adducts can be dispersed in water to form dispersion which cure with various curing agents. Aqueous electrocoating baths can be provided which electrodeposit at the cathode.

17 Claims, No Drawings

4,533,682

IMIDAZOLIDINE-BLOCKED AMINE POLYMERS

DESCRIPTION

TECHNICAL FIELD

This invention relates to water dispersible cationic resins based on polyepoxides, their production, and to the cationic electrocoating of such resins from an aqueous bath containing the same.

BACKGROUND ART

It is known to react polyepoxides with ketimine-blocked amines which include a single secondary amino hydrogen atom. The reaction products can be reacted with an acid to quaternize the tertiary amine groups in the reaction product, and the quaternized reaction product can be dispersed in water. The water reacts with the ketimine groups to release ketone into the water medium and this provides primary amine groups. The resulting amine-functional resin is electrodepositable from aqueous medium at the cathode of a unidirectional electrical system, and it can be cured with a curing agent which is introduced into the water medium for this purpose. The curing agents primarily selected in the prior art have been blocked polyisocyanates. When electrodeposited coatings containing the amine-functional resin and the blocked polyisocyanate are baked, the blocking agent is removed and the amine resin cures. All of the foregoing is illustrated in U.S. Pat. No. 4,031,050.

It would be desirable to replace the blocked polyisocyanate curing agent with an aminoplast resin because these are less costly, but the amine functionality (which is largely constituted by primary amine groups) creates a strongly alkaline environment which inhibits cure with an aminoplast resin.

Another point of importance is the fact that the ketimine-blocked secondary amines which are used in the prior process are derived from diethylene triamine, and it is desired to be able to use ethylene diamine, which is less costly.

Also, and in our prior application Ser. No. 477,432 filed Mar. 21, 1983 entitled Oxazolidine-Blocked Amine Polymers, we reacted a monoalkanol amine, such as monoethanol amine, with an unhindered ketone or aldehyde, and water was removed to generate an oxazolidine which contains a single reactive secondary amino hydrogen atom. This product was then adducted through its secondary amino hydrogen atom with a polyepoxide resin, sufficient oxazolidine being preferably used to consume all of the epoxy groups in the polyepoxide. Upon protonation of at least about 50% of the amine groups in the adduct (which could be nonvolatile when electrocoating was intended) and dispersion in water, hydrolysis of the oxazolidine occurs to generate a secondary amine group. The ketone or aldehyde which formed the oxazolidine was released into the water.

It is desired to employ reaction products possessing a relatively high amine functionality to enable a good cure to be had with blocked polyisocyanates which have lower functionality than typical aminoplast resins, like hexamethoxymethyl melamine. Also, primary amine groups are more reactive and can be used when polyisocyanates are relied upon, and such primary amine groups are not produced in our prior application. It is also desirable to increase the molecular weight of the polyepoxide in some instances by chain extension, and this is also not available in our prior application or in the normal practice of said U.S. Pat. No. 4,031,050.

DISCLOSURE OF INVENTION

In this invention, a mono- or poly- alkylene polyamine, and preferably a monoalkylene amine like ethylene diamine, is reacted with an unhindered ketone, such as cyclohexanone, or an aldehyde, such as formaldehyde, to form an imidazolidine containing a plurality of secondary amino hydrogen atoms. When the imidazolidine is reacted with an organic polyepoxide one forms an adduct reaction product which is dispersible in water when protonated with an acid. Using appropriate proportions one obtains chain extension to provide a higher molecular weight polyimidazolidine containing a plurality of secondary hydroxy groups to enhance water dispersibility and tertiary amine groups which enable water dispersibility with the aid of an acid. On dispersion in water, the imidazolidine groups hydrolyze to release the ketone or aldehyde used in their formation, and amino hydrogen atoms are made available for cure.

The amino hydrogen atoms can all be secondary amino hydrogen atoms, but when desired to increase reaction with a polyisocyanate or polyacrylate, primary amino hydrogen atoms may be present. One can limit the primary amine content when desired, or one can include such groups for greater reactivity.

As will now be evident, the amine polymers of this invention can be cured in various ways, the use of organic polyisocyanates being described in U.S. Pat. No. 4,031,050 noted previously, or one can employ polyacrylates as suggested in U.S. Pat. No. 3,975,251, or one can use aminoplast resins or phenoplast resins, as described in our prior application.

The monoalkylene polyamines and also the polyalkylene polyamines which may be used herein are all diprimary amines. The monoalkylene polyamine preferably used herein is desirably ethylene diamine, but propylene diamine and butylene diamine are also useful.

The polyalkylene polyamines are illustrated by triethylene tetramine and tetraethylene pentamine, but the latter increases the amount of branching because it has three secondary amine groups present. Monoalkylene polyamines with 2–4 carbon atoms and triethylene tetramine are preferred herein.

The ketones and aldehydes which are selected herein to cause imidazolidine production in a reaction involving the removal of water are unhindered. Hindered ketones form ketimines with the primary amine group, and these are not reactive with epoxy resins. Suitable ketones and aldehydes for use herein, in addition to the preferred cyclohexanone, are: formaldehyde, acetaldehyde, benzaldehyde, isobutyraldehyde, acetone, methyl ethyl ketone, and cyclopentanone.

In preferred practice, the imidazolidine is formed using cyclohexanone which is an unhindered ketone which forms the desired ring structure easily. Cyclohexanone is water immiscible and it remains associated with the resin particles which are dispersed in the water medium. As a result, the cyclohexanone is codeposited with that resin at the cathode. As a solvent, the cyclohexanone assists film coalescence, especially as the deposited films are baked. This tends to enhance film gloss and to minimize film defects, like pinholes.

The imidazolidines formed herein contain two secondary amine groups, one for each primary amine group in the starting diprimary amine. There is also present one imidazolidine group for each secondary amine group present in the starting diprimary amine. Thus, using ethylene diamine one obtains two secondary amine groups, and using triethylene tetramine, one obtains two imidazolidine groups and two secondary amine groups.

The polyepoxides which are used herein should have at least 1.2 epoxy groups per molecule, it being preferred to use those polyepoxides having a 1,2-epoxy equivalency up to about 2.0. Since chain extension may be desired, an epoxy equivalency of at least about 1.7 is preferred. It is also preferred to employ a polyepoxide having an average molecular weight determined by calculation of from 1100 to 2500, though higher and lower molecular weights are also useful.

Diglycidyl ethers of a bisphenol are particularly desirable for use as the polyepoxide herein, these being illustrated by the commercially available bisphenol A. Especially preferred polyepoxides are diglycidyl ethers having a 1,2-epoxy equivalency of from about 1.7 to 2.0. The Shell product Epon 829 is particularly preferred, and its molecular weight is increased to the preferred range by prereaction with bisphenol A. Epon 1001 will further illustrate useful diglycidyl ethers. Polyepoxide mixtures containing 10% to 50% of the mixture of a low viscosity polyepoxide, such as the Ciba-Geigy product Araldite RD-2 may be present to provide a less crystalline polymer product having superior flow on baking. These low viscosity polyepoxides are aliphatic diol diepoxides, namely: butane diol diglycidyl ether.

Since electrocoating utility is preferred herein, relatively nonvolatile acids, like dimethylol propionic acid, are quite useful. For electrocoating, and also for other purposes, volatile acids, like acetic acid, can be used.

Since electrocoating utility is preferred, one should employ enough of the imidazolidine reactant to consume all of the epoxy functionality by reaction thereof with secondary amine. With a stoichiometric excess of epoxy functionality, the final water-dispersed product will have both epoxy and amine functionality, and thus it will be unstable and self-curing. With more imidazolidine to include an excess of amino hydrogen, the final product will include some primary amine groups as a result of hydrolysis in the water medium.

Enough acid is used to enable dispersion in water. Normally this requires at least about 50% of the amine groups in the polyimidazolidine reaction product to be neutralized, and typically about 60% will be neutralized. Complete neutralization is permissible, though this is not desired in electrocoating because it decreases the pH of the bath.

While proportions are not of primary significance in this invention, they are helpful in specifying the amounts normally used. On this basis, the imidazolidine is formed by reacting substantially stoichiometric amounts of diprimary amine with the unhindered ketone or aldehyde (one molar proportion for each imidazolidine group to be formed) and the imidazolidine is used in an amount to react with at least 10% of the 1,2-epoxy groups in the polyepoxide. When all the epoxy groups are consumed by reaction, the curing agent which is employed and which is desirably selected from the group of blocked polyisocyanates, aminoplast resins and phenoplast resins of the type which are well known to be useful in aqueous medium, is used in an amount of from 5% to 40% of total resin solids, preferably from 8% to 25% on the same basis. The electrocoating baths which are preferred normally have a resin solids content of from 3% to 20%, preferably from 5% to 15%.

Throughout this specification and claims, and in the examples which follow, all proportions are by weight, unless otherwise specified. These examples show preferred operation to provide an electrocoating system in accordance with this invention. They also show the use of preferred materials.

EXAMPLE 1

(Procedure for the preparation of the imidazolidine of ethylenediamine and cyclohexanone [1,4-diaza spiro(4.5)decane])

Benzene (1 liter, 874 g), ethylenediamine (60.1 g, 1.0 equivalent) and 5.0 g of a sulfonic acid ion exchange resin catalyst providing 0.013 equivalents of acid (the Dow product Dowex 50W-X12 may be used) were charged into a 2000 ml. single neck round bottom flask equipped with a Snyder fractionating column, Dean Stark trap, cold finger reflux condenser, drying tube, heating mantle, transformer, teflon coated magnetic stir bar and a magnetic stir motor. The mixture in the flask was heated to reflux temperature to azeotropically remove water formed during the reaction. Heating was continued overnight collecting a total of 19.35 g water (theoretical=18.02 g). The product was then cooled and filtered through a glass wool plug followed by concentration on a rotary evaporator using aspirator suction and heating to a maximum of 60° C. The amine equivalent weight was then determined to be 75.64 g (theoretical=70.115 g). The infrared spectrum of the product showed traces of residual benzene, cyclohexanone and ketimine by-product and confirmed the desired chemical structure. NMR spectroscopy also confirmed the desired chemical structure and indicated the presence of less than one percent of ketimine.

EXAMPLE 2

(Preparation of imidazolidine-functional epoxy resin derivative)

Epon 829 (122.51 g, 0.6156 equivalent), bisphenol A (54.72 g, 0.4794 equivalent) and 2-butoxy ethanol (78 g) were placed in a 500 ml. flask equipped with stirrer, thermometer, nitrogen inlet, condenser with drying tube, and heating mantle. The mixture was heated under a nitrogen blanket and held at 170° C. until an epoxy value of 0.534 meq./g sample was reached. This took approximately 3 hours.

The reaction mixture was then cooled to 60° C. and the imidazolidine product of Example 1 (17.77 g, 0.2349 equivalent) was rapidly added over a period of 3 minutes. The temperature was then slowly increased to 100° C. and held there until the epoxy value had reached zero, which occurred in 3 hours. The product was then cooled to 60° C., at which time 26.0 g of methyl ethyl ketone and 26.0 g of isopropanol were added.

EXAMPLE 3

(Preparation of water dispersion, incorporation of curing agent, and electrodeposition and cure)

The imidazolidine-functional epoxy resin derivative of Example 2 (44.31 g of solution, 0.0346 equivalent of secondary amine) was mixed with a blocked-isocyanate crosslinking agent (see note 1) in an amount to provide 1.5 equivalents of isocyanate for each equivalent of primary amine functionality which it is expected will be liberated on hydrolysis. This mixture was then neutralized to an extent of 60% with acetic acid (1.25 g, 0.0208 equivalent). The resulting solution was then dispersed in deionized water (245 g) using a high speed mixer to yield a solution at approximately 12% nonvolatile solids content.

This solution was then electrodeposited on a steel cathode by the application of 50 volts for 90 seconds. The coated steel panel was then baked in an oven maintained at 325° F. for 25 minutes. The cured film so-provided was 1-2 mils in thickness and resisted 100 methyl ethyl ketone double rubs.

Note 1: Isooctanol-blocked toluene diisocyanate (a mixture of isomers mostly constituted by the 2,4-isomer). The material is used in solution containing 80% solids in 2-butoxy ethanol solvent. 7.0 grams (0.026 equivalent) is used in this example.

What is claimed is:

1. A protonated adduct reaction product which is an adduct of:
   (1) an imidazolidine which is the reaction product of an unhindered ketone or aldehyde with a diprimary amine which is a mono- or poly-alkylene polyamine; with
   (2) an organic polyepoxide having a 1,2-epoxy equivalency of at least about 1.2; said imidazolidine being used in an amount sufficient to react with at least 10% of the 1,2-oxirane groups in said polyepoxide; and said adduct being reacted with
   (3) an acid to protonate at least 50% of the amine groups which are present.

2. A water dispersion of the protonated adduct of claim 1, said adduct being hydrolyzed in said dispersion to generate amino hydrogen atoms therein.

3. A protonated adduct as recited in claim 1 in which said imidazolidine is formed by reaction of reactants including ethylene diamine.

4. A protonated adduct as recited in claim 1 in which said imidazolidine is formed by reaction of reactants including cyclohexanone.

5. A protonated adduct as recited in claim 3 in which said ethylene diamine is reacted with cyclohexanone.

6. A protonated adduct as recited in claim 1 in which said organic polyepoxide is a diglycidyl ether of a bisphenol, said ether having a 1,2-epoxy equivalency of 1.7 to 2.0.

7. A protonated adduct as recited in claim 1 in which said organic polyepoxide has an average molecular weight of from 1100 to 2500.

8. A protonated adduct as recited in claim 6 in which said organic polyepoxide has an average molecular weight of from 1100 to 2500.

9. A protonated adduct as recited in claim 8 in which said organic polyepoxide is used in admixture with from 10% to 50% of a low viscosity aliphatic diol diepoxide.

10. A protonated adduct as recited in claim 9 in which said diol diepoxide is butane diol diglycidyl ether.

11. A protonated adduct as recited in claim 8 in which said imidazolidine is formed by reaction of ethylene diamine with cyclohexanone.

12. A protonated adduct as recited in claim 1 in which substantially all of the epoxy functionality in said polyepoxide is consumed by reaction with said imidazolidine, and said polyamine is selected from the group consisting of monoalkylene polyamines having from 2-4 carbon atoms in the alkylene group, and triethylene tetramine.

13. A protonated adduct as recited in claim 11 in which substantially all of the epoxy functionality in said polyepoxide is consumed by reaction with said imidazolidine.

14. A water dispersion of the protonated adduct of claim 1, said protonated adduct being hydrolyzed in said dispersion to generate secondary amine groups and primary amine groups therein.

15. An aqueous thermosetting coating dispersion comprising the dispersion of claim 1 in admixture with a curing agent selected from blocked organic polyisocyanate, aminoplast resin and phenoplast resin.

16. An electrocoating bath comprising the aqueous dispersion of claim 2 having a resin solids content of from 5% to 15% in admixture with a blocked organic polyisocyanate.

17. An electrocoating bath comprising the aqueous dispersion mixture of claim 15 having a resin solids content of from 3% to 20%.

* * * * *

UNITED STATES PATENT AND TRADEMARK OFFICE
CERTIFICATE OF CORRECTION

PATENT NO. : 4,533,682
DATED : August 6, 1985
INVENTOR(S) : Anthony J. Tortorello et al.

It is certified that error appears in the above-identified patent and that said Letters Patent is hereby corrected as shown below:

Column 6, line 34 (first line of claim 15), change the claim dependency from "1" to: --2--.

Signed and Sealed this

First Day of October 1985

[SEAL]

Attest:

Attesting Officer

DONALD J. QUIGG

Commissioner of Patents and Trademarks—Designate